United States Patent [19]

Sutton

[11] 4,052,570
[45] Oct. 4, 1977

[54] TELEPHONE SYSTEM

[76] Inventor: Paul J. Sutton, 300 Central Park West, New York, N.Y. 10024

[21] Appl. No.: 643,322

[22] Filed: Dec. 22, 1975

[51] Int. Cl.² ............................................. H04M 1/50
[52] U.S. Cl. .................................................. 179/90 B
[58] Field of Search ........... 179/90 B, 90 BB, 90 BD, 179/90 CS, 90 AD, 5 R, 90 K

[56] References Cited

U.S. PATENT DOCUMENTS

| | | | |
|---|---|---|---|
| 3,760,121 | 9/1973 | Nissim | 179/90 K |
| 3,792,203 | 2/1974 | Martin | 179/90 B |
| 3,868,479 | 2/1975 | Schweitzer | 179/90 B |
| 3,885,108 | 5/1975 | Zock | 179/90 B |
| 3,899,645 | 8/1975 | Brafman | 179/5 R |
| 3,920,926 | 11/1975 | Lenaerts et al. | 179/90 B |

*Primary Examiner*—Thomas A. Robinson
*Assistant Examiner*—Gerald L. Brigance
*Attorney, Agent, or Firm*—Paul J. Sutton

[57] ABSTRACT

A telephone set which will automatically redial a telephone number after a busy signal has been received and continues redialing that number until the party being called answers, or until a predetermined number of attempts have been made. As the user dials a telephone number onto the telephone line, whether by manual dialing or by utilizing pulse-type dialing of "touch-tone" type, the number is simultaneously stored in a storing device. A signal detector detects the receiving of a busy signal in response to the dialing of the telephone number. A control circuit, responsive to both the detection of a busy signal and the releasing of the telephone line, waits a predetermined fixed amount of time subsequent to which it seizes the line and causes the number stored to be redialed onto the telephone line. If a busy signal again occurs, a line disconnect circuit responds by releasing the line. The routine is repeated for a predetermined number of times or until a normal ringing signal is obtained, and thereafter the control circuit and the storing means are reset.

22 Claims, 4 Drawing Figures

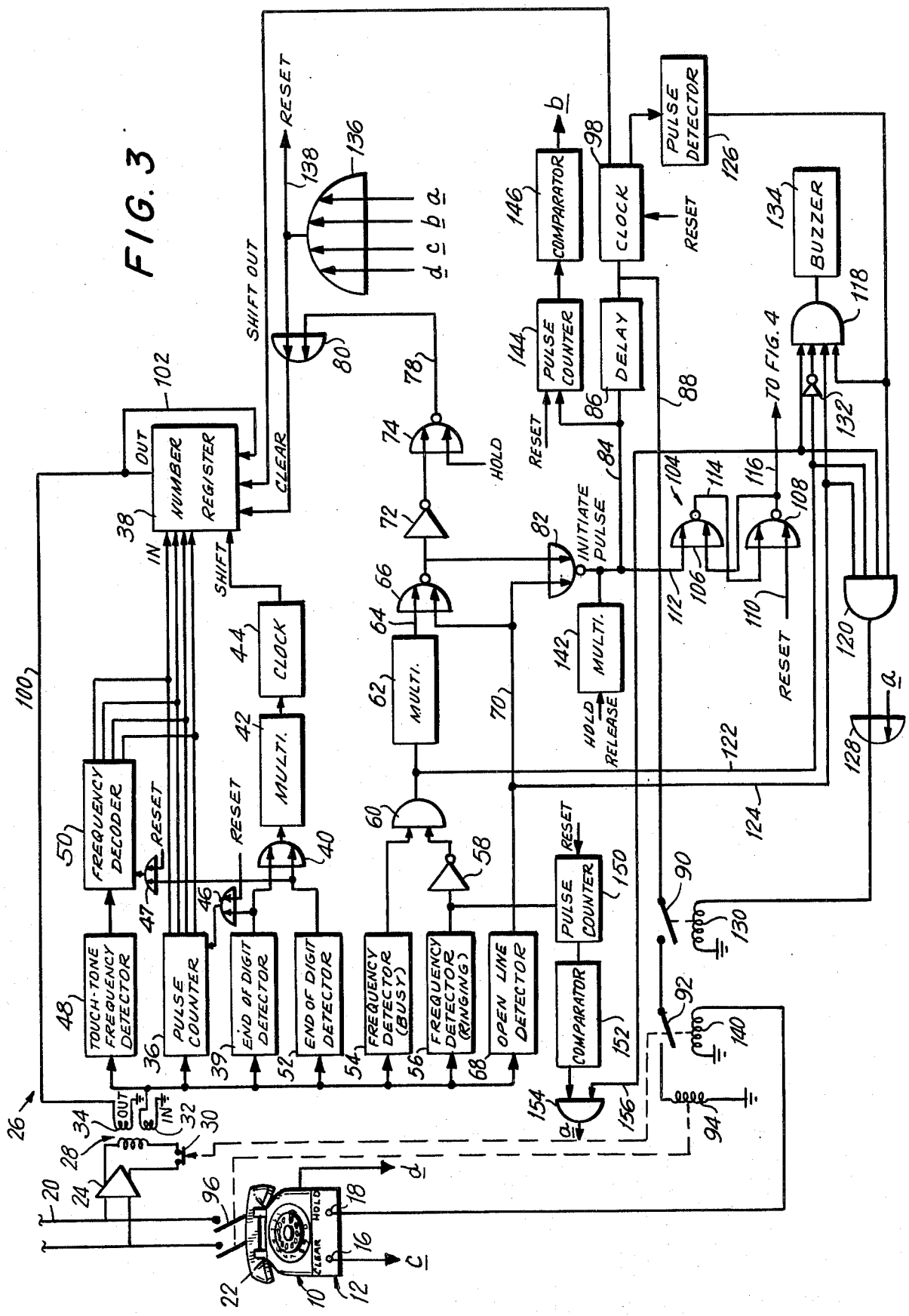

TELEPHONE SYSTEM

BACKGROUND OF THE INVENTION

This invention relates to telephone sets, and more particularly to a telephone set and system capable of automatically redialing a telephone number onto a telephone line in response to receiving a busy signal.

The telephone has become one of the most widely used instruments of communication. As a result of such increased usage, the occurrence of busy signals while trying to reach a party, has now increased. One of the most annoying and time-consuming aspects of telephone communication is the continued attempts to reach a party and consistently receiving busy signals. Frequently, a user will redial at regular intervals the number of the party being called and continue to receive busy signals. Each time, he must independently redial the number and wait until he is connected only to again receive a busy signal. The redialing wastes a lot of time and effort and can be psychologically agonizing in cases where the call is important or reflects an emergency.

While numerous automatic dialing telephone sets are available, in each case it is necessary to insert a card, press a dialing button, or in some way initiate the redialing of the number each time it is desired to call the party. Furthermore, each time the number is dialed it is necessary to remove the handset from the cradle, wait until the line is connected to the calling party, and if again receiving a busy signal, the handset must be returned to the cradle and the process repeated.

Accordingly, it is an object of the present invention to avoid the aforementioned problems of existing telephone equipment.

Another object of the present invention is to provide a telephone set having an automatic dialer, either as a part thereof or as an attachment thereto, which continuously redials a number after receiving a busy signal.

Still a further object of the present invention is to provide a telephone set which is responsive to receiving a busy signal, and which automatically redials the same number at regular intervals until the party being called is reached.

A further object of the present invention is to provide a telephone set which will automatically redial a number after receiving a busy signal, and when a regular ringing signal is finally reached will signal the user by means of a visual or audible signal.

Another object of the present invention is to provide a telephone set which continuously dials a number after receiving a busy signal, and upon receiving a regular ringing signal from the party being called will continue holding and maintaining the ringing signals for a predetermined interval of time.

Yet a further object of the present invention is to provide a telephone set which automatically redials a number after receiving a busy signal, and upon reaching the party being called and the user himself is no longer available to answer, will sound a prerecorded message to the party being called.

Still another object of the present invention is to provide a telephone set which automatically redials a telephone number at regular intervals after having received a busy signal, and which can be temporarily deactivated such that the telephone set can be used in a normal manner.

Another object of the present invention is to provide an attachment for a telephone set which provides automatic redialing of a telephone number at regular intervals after having received an initial busy signal.

These and other objects, and features of the invention will be apparent from the following description of the invention.

SUMMARY OF THE INVENTION

Briefly, the invention provides a telephone set including a telephone set housing means which contains a standard telephone circuit for dialing and receiving telephone numbers onto a telephone line. A storing means is coupled to the telephone circuit and located within the housing means for storing the telephone number dialed onto the telephone line. A signal detector also contained in the housing means is coupled to the telephone circuit for detecting the receiving of a busy signal in response to the dialing of the telephone number. A control means, also contained in the housing means, is coupled to the detection means and causes the stored numbers to be dialed onto the telephone line.

In an embodiment of the invention there is further included an open line detector means coupled to the control means for detecting when the telephone line is released. A gating means is coupled to the open line detection means, as well as to the signal detector means and produces a dialing signal which causes the control means to dial the stored number onto the line. Prior to redialing of the number, the control means seizes the telephone line and upon further receiving a busy signal after the stored number is dialed on the line, a line disconnect means contained in the control means disconnects the line.

In another embodiment of the invention the control means, storing means, signal detector means, and associated circuity are provided in a separate housing means which can be attached to a standard telephone set.

BRIEF DESCRIPTION OF THE DRAWING

In the drawings:

FIG. 3 is a circuit diagram of an embodiment of the present invention, and

DETAILED DESCRIPTION OF THE INVENTION

Figure 1:
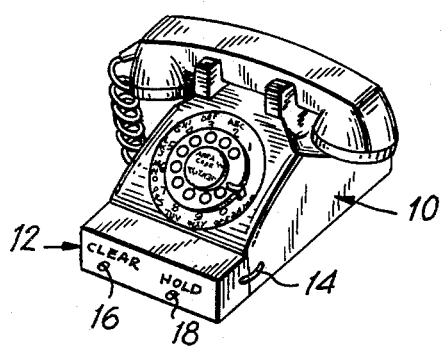
FIG. 1 is an isometric view of a telephone set incorporating the present invention as an attachment unit.

The present invention provides an automatic redialing circuit which automatically redials a number after receiving a busy signal. The redialing circuitry can be directly incorporated within the telephone set housing or can be provided as an attachment unit which is coupled to a standard telephone set. Referring now to FIG. 1, there is shown a standard telephone set 10 which includes a standard telephone set housing and contains standard telephone circuitry which can dial and receive telephone numbers onto a telephone line. An attachment unit 12 is placed near the telephone set and is electrically coupled thereto by means of the line 14. The attachment unit contains a clear button 16 and a hold button 18 whose use will hereinafter be explained.

The circuitry for providing the present invention will be described with respect to FIG. 3. The telephone set 10 is interconnected to a telephone line 20. When the handset 22 is removed from the cradle (not shown), the line is seized and dialing pulses can be placed directly on the line. The dialing pulses can result from a rotary dialer type telephone set, a Touch-Tone type set, a card reading telephone set, or any other type of telephone set where numbers are dialed and placed on the telephone line. Connected to the telephone line through a line isolator, such as a filter 24, is the circuitry 26 needed to carry out the redialing. A transformer 28 is connected in parallel to the output of the isolator 24 through a normally closed switch 30 placed in series with the primary of the transformer. The secondary of the transformer includes a first section 32 which permits pulses and voice signals contained on the line to be transmitted to the circuit of the present invention, and another secondary section 34 which permits pulses to be transmitted onto the telephone lines from the present invention circuit.

Input pulses are detected as they are placed on the line through the secondary section 32. If a rotary dialer or other digital encoding device is used to place the pulses on the line, a pulse counter 36 counts the number of pulses placed on the line and stores them in parallel into the number register 38. As is well known, standard telephone dialing pulses occur at a prefixed repetition rate. When there exists a pause in this rate indicating the absence of a periodic pulse, the end-of-diget detector 39 sends a signal digit through the OR gate 40 to trigger a multivibrator 42 providing a predetermined pulse width. During the presence of this pulse, a clock 44 is energized to provide a fixed number of clock pulses to shift the number register 39. The output from the end-of-digit detector 39 is also sent through OR gate 46 to reset the pulse counter 36 so that it can then receive the next dialed digit. As a result, as digits are dialed onto a telephone line, the same digits are counted and stored, and a predetermined fixed number of pulses is provided between each of the stored digits as a delay space.

Should a Touch-Tone telephone be utilized for dialing the pulses, the pulses are represented by a combination of two frequencies. The two frequencies are fed into the Touch Tone frequency detector 48. This detector can include a plurality of phase locked loops each tuned to a particular one of the frequencies utilized in the Touch-Tone system. The output from frequency detector 48 will then be decoded into its corresponding number by the frequency decoder 50 and this number will be stored into the number shift register 38. After the occurrence of two simultaneous frequencies, the end-of-digit detector 52 will sense a pause in the occurence of the frequencies and will send a signal through OR gate 40 to the multivibrator 42 to cause the clock 44 to shift the number register 38 a predetermined amount. Frequency decoder 50 will also be reset through OR gate 47. In this manner, both digital dialed pulses as well as Touch-Tone signals will be detected, and the number dialed onto the telephone line will be stored in the number register 38.

After the number has been dialed onto the telephone line, the response will be either a busy signal, or a ringing signal. Frequency detector 54 is tuned to the frequency of the busy signal and will produce a low level output when no busy signal is received and a high level output at the occurrence of a busy signal. Frequency detector 56 is tuned to the normal ringing signal and will produce a low output in response to the absence of such ringing signals, and a high output when such ringing signals are present. Should the response to the dialed number be a normal ringing signal, the high output from detector 56 will be converted to a low output by inverter 58 which will then enter AND gate 60. The output from the frequency detector 54 will also be a low since the number is not busy, whereby the output from AND gate 60 will be a low. A multivibrator 62 of the set-reset type will be reset by this low output to provide a low output on line 64 to NOR gate 66.

When the line is seized, by taking the handset 22 from the cradle, a voltage appears on the telephone line which causes the open-line detector 68 to produce a high level output. When the line is released, the voltage will be removed and the output from the open-line detector will be a low level. After the dialing of a phone call and the entering of the pulses or frequencies onto the line, when the handset is returned to the cradle, the low output from the open-line detector on line 70 will combine with the low output on line 64 caused by the previous presence of a ringing signal to give a high output from NOR gate 66. This high will be inverted by the inverter 72 to give a low input to NOR gate 74 whose other input on line 76 represents a hold signal which is normally low. This combination produces a high output on line 78 which will pass through OR gate 80 and serve as a clear signal to the number register 38.

In the foregoing manner, when a phone call is placed on the line using the telephone-set, the number will be stored in the number register 38. However, if a normal ringing signal is received in response to the call, whether or not the called party will answer, when the handset is returned to the cradle, the number will be cleared from the number register to prepare if for the next call.

If, on the other hand, in response to the dialed number a busy signal is received, the output from the frequency detector 54 will be a high and the output from frequency detector 56 will be a low, which will be inverted by inverter 58 to produce a high, causing a high output from AND 60 and from the multivibrator 62. The high on line 64 will be an input to the NOR gate 66 which will thereby prevent a clear pulse from entering the number register 38 after the line is released by returning the handset to the cradle. In this manner, when a busy signal is reached, the number will remain stored in the number register 38.

The purpose of the multivibrator 62 is to hold the output from the AND gate 60 so that the results of detecting a busy or a ringing signal will be maintained until such time as the open-line detector can detect the release of the line. Although the circuit could be rearranged to utilize only a single frequency detector for only a busy signal or only a ringing signal, the use of both frequency detectors prevents the possibility of mistaking the lack of any signal on the line from being erroneously interpreted as a busy or a ringing signal. Frequently there occurs a long pause prior to the receiving of either a busy or ringing signal and such pause would be misinterpreted. By using the two frequency detectors it will be insured that only busy or ringing signals are detected.

Should a busy signal have been received, the output from NOR gate 66 is maintained low by means of the multivibrator 62 in combination with the presence of a low output resulting from the line release on line 70. This low output from NOR 66 will combine with the low output on line 70 to produce a high output pulse from NOR gate 82. This high output pulse serves an initiate pulse to the redialing circuitry of the present invention. The output pulse is sent along line 84 to a delay network 86. The delay network is preset to provide the fixed waiting time interval before redialing the same number again. Such interval can be set, by way of example, at 1 or 2 minute intervals, as desired. At the end of the predetermined waiting period, a first signal is sent along line 88 through normally closed switch 90 and normally closed switch 92 to energize the relay coil 94 which closes the normally open switches 96 in parallel with the handset, thereby seizing the line. The switches 96 serves as the equivalent of raising the handset from the cradle. The output from the delay 86 also triggers a clock 98 which produces shift-out pulses to the number register 38 to serially shift out the stored number onto the telephone line along output line 100 and through the secondary 34 of the transformer 28 and onto the line 20. The number register 38 is a recirculating type register so that as the numbers are shifted out they recirculate back into the input of the number register 38 by means of the recirculating line 102. In this way, although the numbers are dialed onto the telephone line they are also stored again into the register. The clock 98 is preset to produce the maximum number of clock pulses which could exist in the highest theoretically possible telephone number. For example, in a telephone number including an area code there could be a total of 10 digits, and assuming the highest number 9 in each digit there exists a total of 90 pulses. Additionally, there should be enough clock pulses to include the pulse intervals contained between each of the digits. The number register 38 should also contain the same number of available positions. As a result, the full sequence of the clock pulses from clock 98 should equal a complete cycle of the number on the number register 38 such that at the end of the clock sequence the number stored in the numbers register is in the same position as when it started.

As a result of the foregoing operations, if a busy signal is detected when the user dialed a number on the line, after the user returns the handset to the cradle, the initiate pulse will cause the waiting time delay to commence, at end of which the line is seized through the relay 94 and the number is shifted onto the line by means of the clock 98.

The initiate pulse at the output of the NOR gate 82 is also sent to a holding circuit shown generally at 104 and including two NOR gates 106 and 108. Initially, the reset line 110 is low. Before the occurrence of the initiate pulse, the input on line 112 to gate 106 will be a low and the output of gate 106 on line 114 will be a high, causing the output on line 116 from NOR gate 108 to be a low. Upon the occurrence of an initiate pulse, which is a high, the output from NOR gate 106 will be changed to a low and the output on line 116 from NOR gate 108 will be changed to a high. This high will be maintained even though the initiate pulse may change back to a low after the next seizing of the line during the automatic redialing. The output on line 116 being a high provides an indication that the redialing circuitry is in operation.

Such operational indication on line 116 is provided as one of the inputs to AND gate 118 and AND gate 120 so that these two gates will only operate after the first initiate pulse which causes a high to be placed at the output line 116 of the holding circuit 104.

After the number has been placed on the telephone line from the number register, if a busy signal is again detected by the frequency detector 54 the output from AND gate 60 will be a high which will be sent along line 122 to AND gate 120. The other input to AND 120 will come from the open-line detector on line 124 which will be a high when the line has been seized. The last input to gate 120 is from pulse detector 126 which produces a high output only after the clock 98 has completed its complete sequence, thereby indicating that the stored number has been placed on the line. As a result, gate 120 will produce a high output at the concurrence of seizing the line, the presence of a busy signal on the line, after the number has been completely dialed onto the line, and only during the course of operation of the automatic redialing. Should all these occur, there will be a high output from AND gate 120 which will pass through OR gate 128 to energize the relay coil 130 thereby opening the normally closed switch 90 to removing the current from the coil 94 and release it, thereby opening the line switch 96 and releasing the telephone line. At this point the open-line detector 68 will produce a low output on line 70 which will again cause an initiate pulse at the output of NOR gate 82 and will again start the sequence of redialing the stored pulses onto the telephone line.

The above sequence of redialing, waiting, detecting a busy, and then releasing the line, will continue repetitively. However, should the automatic redialing produce a normal ringing signal instead of a busy signal, the output from the frequency detector 54 will now be a low, while the output from the frequency detector 56 will be a high which will be inverted to produce a low at the output of AND 60. This low will be sent along line 122, and inverted by the inverter 132, to produce a high input to gate 118. The output on line 124 will also be a high since the line has been seized, and when the number has been completely dialed, the output from the pulse detector 126 will also be a high. As a result, after the automatic dialing of a stored number from the number register onto the telephone line, and if the response is a normal ringing, AND gate 118 will produce a high pputput which will trigger the buzzer 134 causing an audible sound to be heard, calling attention to the user that the number he desires has finally been reached. Instead of the audible buzzer a visual indicator can be provided. The user will then be able to pick up his handset and wait until the party being called answers the other end of the line, thereby completing the call.

After the user has completed the call, he will return the handset 22 onto its cradle. A switch (not shown) is included on the cradle so that as the handset is lifted from the cradle a high pulse is generated on line d. This d pulse is sent through the OR gate 136 and generates a reset pulse on line 138. The reset pulse is utilized to terminate the operation of the redialing circuit as well as clear the number register. The reset pulse of line 138 passes through the OR gate 80 to clear the number register. It is also used as a reset pulse through OR gates 46 and 47 to clear the pulse counter 36 and the frequency decoder 50. It also resets the clock 98. Furthermore, the reset pulse enters the holding circuit 104 on line 110 and will now restore the initial conditions onto the holding circuti 104 to again place a low output on line 116, thereby terminating the operation of the redialing circuitry.

At all times, lifting of the handset from the cradle will terminate the operation of the redialing circuitry and clear the number register. In this manner, if one number has been dialed and a busy signal is received, the user can hang up, lift the receiver again from the cradle and dial a second number. The lifting of the receiver will automatically clear the first number from the number register to permit the second number to be stored. As a result, it is only the last number dialed which will be stored and the entire circuitry will always be available to redial the last number stored.

At the same time, the user may desire to temporarily hold the operation of the redialing circuitry for a while without terminating it. For example, the user may dial a first number, and upon receiving a busy signal, he may want to try a second number, but at the same time, retain the first number stored. Then, should the second number also be busy he desires to have the first number continuously redialed. Also, after the automatic redialing circuitry has been operating for a while, the user may have to leave the premises for a few minutes and wants to temporarily stop the automatic redialing. When he returns, he wants the redialing resumed. For this purpose a hold botton 18 is provided on the telephone set. When the hold button is depressed, the coil 140 is energized. This serves to open the normally closed switch 92 thereby releasing the line. In this manner, should the control circuitry be in the process of dialing a stored number onto the line, such dialing will be stopped. At the same time, the relay 140 also opens the normally closed switch 30 thereby preventing any further number from being stored onto the control circuitry. However, the rest of the circuitry remains intact so that should the circuit be in the middle of dialing, the number register will continue shifting until the number is again restored into its initial position, although the number will not be entered onto the list. All of the other operations will also continue in normal sequence until a cycle is completed and then will be temporarily held. When the hold button 18 is later released by the user, a hold release signal is sent to the multivibrator 142 which sends a pulse duplicating the initiate pulse and restarts the cycle for redialing.

In order to prevent the redialing circuitry from redialing indefinitely, a pulse counter 144 counts the number of initiate pulses occurring. It compares this number in comparator 146 with a predetermined number and upon the occurrence of such predetermined number procedures an output $b$. Thus, any number of redialing times can be preset in the comparator. For example, it may be desired to redial the number ten times and after not receiving the party being called for those ten times the redialing sequence will end. At the end of this number, the $b$ pulse will be sent through OR gate 136 and provide a reset pulse on line 138, as heretofore described. The reset pulse is also used to reset pulse counter 144.

A clear button 16 is provided on the telephone set which duplicates the operation of lifting the handset from the cradle. Thus, when depressing the clear button 16, a signal is sent on line $c$ to the OR gate 136 which also produces a reset signal.

After redialing the number automatically and obtaining a regular ringing signal, it may happen that the party being called is not at his location. If the user has responded to the buzzer and picked up the handset, he can then hear that the called party is not present, and the user can then return the handset to the cradle. When the handset is lifted from the cradle, the circuitry is reset. However, if the user is no longer at the premises when the ringing signal has been received, and should the user have previously failed to press the hold button, it is necessary to terminate the ringing after a predetermined amount of time. For this purpose a pulse counter 150 is provided at the output of the frequency detector 56. As each of the ringing signals occurs, a pulse is produced by the frequency detector 56 and these pulses are counted. A predetermined number of counts can be entered in the comparator 152, and when that count is reached a signal is sent to AND gate 154. The other input to AND gate 154 on line 156 comes from the output of the holding circuit 104 on line 116 to insure that AND gate 154 will only be energized during the course of the redialing operation and not during the initial dialing by the user himself. After the predetermined number of rings have been reached, an output signal $a$ is provided from gate 154 which is sent to OR gate 136 to produce a reset signal, thereby terminating the operation of the redialing circuitry and clearing the number register. The pulse counter 150 is also reset by the reset signal.

Figure 4:
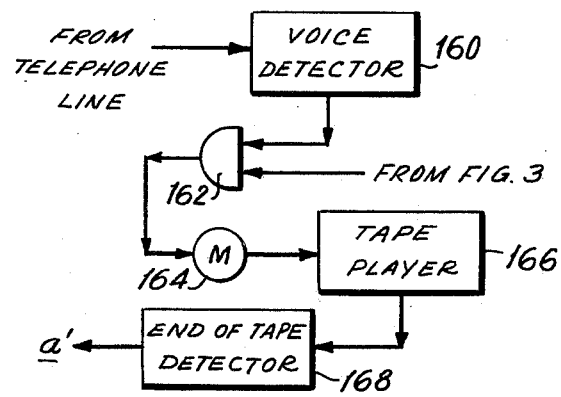
FIG. 4 is a circuit diagram showing an additional feature of the present invention.

If the redialing circuitry dials the numbers stored onto the telephone line, and then receives a normal ringing signal, it is possible that the called party will answer the phone, however, the user may have left the premises and will no longer be available to respond to the buzzing signal. The party being called will then pick up his phone and will find nobody at the other end. For this purpose a tape message can be included, as is described in FIG. 4. When voice is detected from the line through the transformer, a voice detector 160 produces a high level output signal which enters AND gate 162. The other input to AND gate 162 comes from the holding circuit 104 (FIG. 3) so that only when voice is detected during the course of the redialing operation will this circuit be in effect. The output from gate 162 will be a high, which will turn on the motor 164 to operate the tape player 166. The tape player will then send an audible message onto the telephone line through line through the transformer. The message can state, by way of example, that the user has been trying to reach the party being called but is no longer at the premises and will try to reach him at a later time. At the end of the message, an end of tape detector 168 will cause a signal $a'$ to be sent into OR gate 136, in a manner similar to the previously described $a$ signal, which will cause a reset of the entire circuitry and a clearing of the number register. Generally, an endless tape is utilized on a cassette player. At the end of the tape a metallic contact can be placed which will interconnect two terminals and thereby complete a circuit causing a pulse. This pulse can be the end-of-pulse signal $a'$ from detector 168 of FIG. 4.

Figure 2:
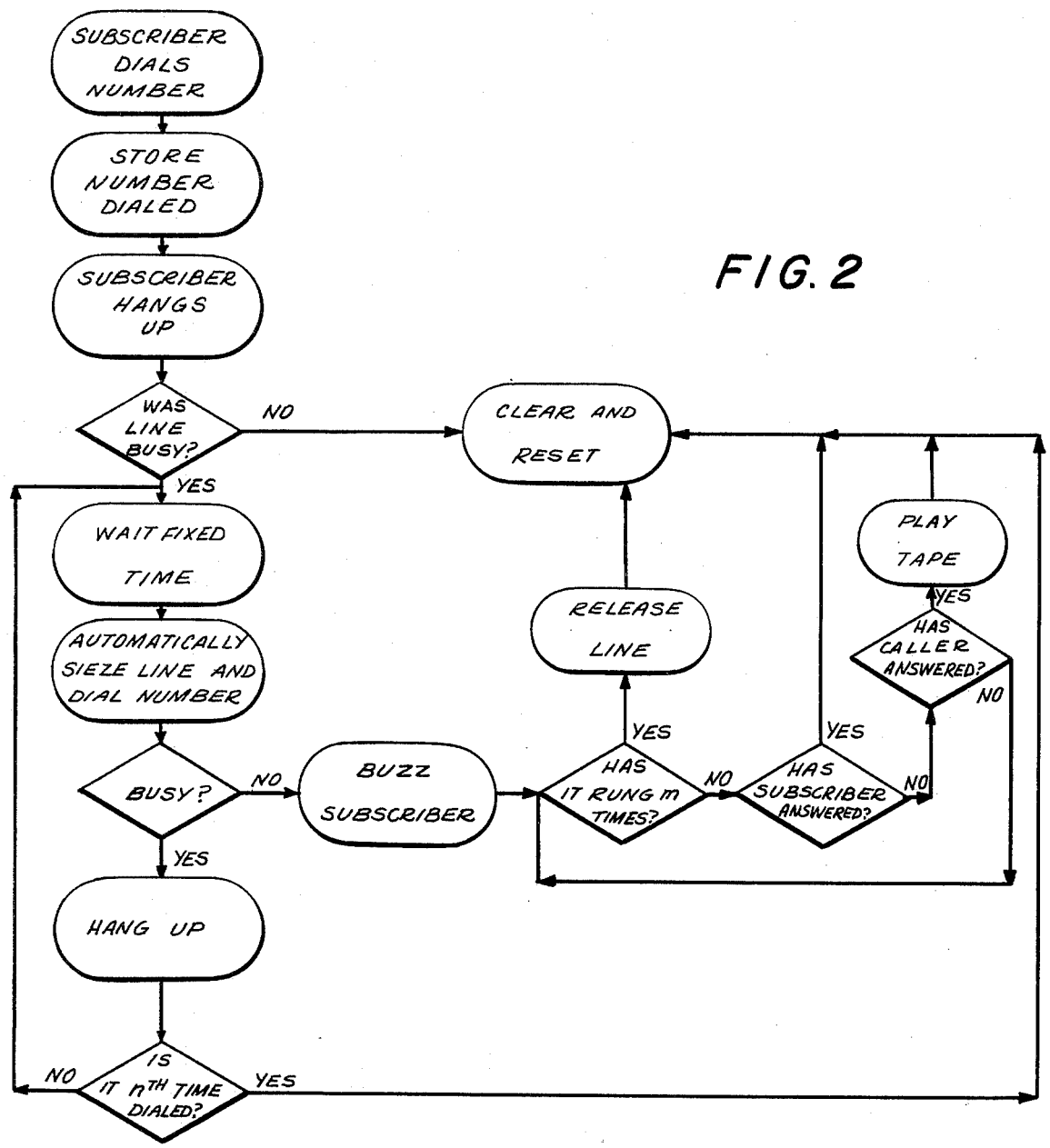
FIG. 2 is a flow diagram showing the operation of the present invention.

Referring now to FIG. 2 there is shown a flow diagram which will explain the operation of the circuits heretofore described. Initially, the subscriber dials a number in a normal manner. As the number is placed on the line it is simultaneously stored in the number register. When the subscriber hangs up, a determination is made whether the line was busy or not. If the line was not busy, then the number is cleared from the number register and the device is ready for operation again. On the other hand, if the line was busy, a predetermined amount of time is waited after which the line is again seized and the number is again automatically dialed from the number stored in the number register. Again a determination is made if the line is busy. If it is, the line is released thereby hanging up the line. A predetermined number of times, for example, N, is set to restrict the number of times redialing occurs. If the Nth time has not been reached, the cycle repeats itself and again the time is waited whereupon it seizes the line and again dials the number. If the Nth time has been reached, the system will clear the stored number and reset itself.

If the recycling of the number does not produce a busy signal, the subscriber is then buzzed. A predetermined number of rings is permitted, for example M. If M rings have not yet occurred, and the subscriber has answered his phone, when he picks the handset off the cradle the system will be reset and the number cleared from the number register. If the predetermined M number of rings has occurred, and the subscriber has not answered, the line will automatically be released and again the system cleared and reset. On the other hand, if the party being called responds, but the subscriber has not answered, a tape message is played to the party being called and the line is again cleared and reset.

The above-described circuit can either be included directly in the telephone set or can be placed in a separate housing and provided as an attachment for existing telephone sets. It is noted that only two connections need be placed onto the telephone set and, specifically, the wires leading directly to the telephone line from the telephone set. It is also noted that all types of dialing can be utilized including push button, Touch-Tone, rotary dialing, or any kind of automatic code dialing.

Each of the detectors, decoders, etc., are standard well known types of circuits and can be made by means of integrated circuits. For example, an integrated circuit chip No. 7490 is of a well known binary counter type, and a binary decimal decoder can be made of integrated circuit chip No. 7445. Similarly, all of the gating circuits can be made out of integrated circuits and the number register can be a recirculating shift register.

Although a specific circuit has been described for carrying out the concepts of the present invention it is understood that such is shown only by means of a preferred embodiment and modifications can be made thereto by those skilled in the art to reroute or simplify certain of the circuits paths.

There have been disclosed heretofore the best embodiments of the invention presently contemplated. However, it is to be understood that various changes and modifications may be made thereto without departing from the spirit of the invention.

What is claimed is:

1. An attachment for a telephone set which dials telephone numbers onto a telephone line, or the like, said attachment comprising:
   a. storing means coupled to said telephone set for storing a telephone number at the same time as it is initially dialed and transmitted onto the telephone line;
   b. signal detector means coupled to said telephone set for detecting the receiving of a busy signal in response to the initial dialing of said telephone number and in the absence thereof clearing said storing means; and
   c. control means coupled to said signal detector means; and responding to the receipt of a busy signal and the releasing of the telephone line for causing the number stored to be re-dialed onto the telephone line, said control means comprising release means coupled to the telephone set for terminating the operation of said control means and clearing said storing means when the handset is subsequently removed from the cradle of the telephone set.

2. The attachment as in claim 1 and further comprising open-line detector means coupled to said control means for detecting when the telephone line is released, and gating means coupled to said open-line detector means and said signal detector means and producing a re-dialing signal upon both the detection of a busy signal and the detection of the release of the telephone line, said control means causing said number stored to be re-dialed only in response to said redialing signal.

3. The attachment as in claim 2 and wherein said control means further includes line-connecting means for seizing the telephone line prior to causing the number stored to be dialed onto the telephone line, and line-disconnect means responsive to the receiving of a busy signal after said stored number is re-dialed onto the telephone line and thereupon releasing the line.

4. The attachment as in claim 3 and wherein said control circuit further comprises delay means coupled between said gating means and said line-connecting means for delaying the seizing of the telephone line after receiving said re-dialing signal.

5. The attachment as in claim 3 and wherein said control means further comprises repetition counting means for counting the number of times said stored number is re-dialed onto the telephone line, and upon reaching a predetermined count terminating the operation of said control means and clearing said storing means.

6. The attachment as in claim 3 and wherein said control means further comprises signaling means responsive to a ring signal when said stored number is re-dialed onto the telephone line, and thereupon providing an output signal.

7. The attachment as in claim 3 and wherein said control means further comprises means responsive to the lack of receiving a ring signal when said number stored is re-dialed onto the telephone line, and for holding the line for a predetermined length of time and thereupon activating said line disconnect means for releasing the line and for terminating the operation of said control means and clearing said storing means.

8. The attachment as in claim 3 and further comprising voice detection means for providing an answer signal when the called party answers the phone, and tape playing means coupled to both said voice detecting means and said gating means for playing an audible message onto the telephone line when a re-dialing signal is present and the called party answers.

9. The attachment as in claim 8 and further comprising end of tape detector means for sensing the end of the tape and in response thereto terminating the operation of said control means and clearing said storing means.

10. The attachment as in claim 3 and wherein said control means comprises holding switch means for temporarily suspending the operation of said control means.

11. The attachment as in claim 10, and wherein said holding switch means inhibits said detector means from detecting said busy signals and inhibits said memory from storing numbers.

12. The attachment as in claim 1 further comprising digit detector means connected between said handset and said storing means for detecting both rotary dialed numbers and Touch-Tone dialed numbers.

13. A telephone set comprising:
   a. a telephone set housing means;
   b. telephone circuit means for dialing and receiving telephone numbers onto a telephone line;

c. storing means coupled to said telephone circuit means for storing a telephone number at the same time as it is initially dialed and transmitted onto the telephone line;

d. signal detector means coupled to said telephone circuit means for detecting the receiving of a busy signal in response to the initial dialing of said telephone number and in the absence thereof clearing said storing means; and e. control means coupled to said signal detector means responding to the receipt of a busy signal and the releasing of the telephone line for causing the number stored to be re-dialed onto the telephone line, said control means comprising release means coupled to the telephone set for terminating the operation of said control means and clearing said storing means when the handset is subsequently removed from the cradle of the telephone set.

14. The telephone set as in claim 13 and further comprising open-line detector means coupled to said control means for detecting when the telephone line is released, and gating means coupled to said open line detector means and said signal detector means for producing a re-dialing signal upon both the detection of the busy signal and the detection of the release of the telephone line, said control means causing said number stored to be re-dialed only in response to said redialing signal.

15. The telephone set as in claim 14 and wherein said control means further includes line-connecting means for seizing the telephone line prior to causing the number stored to be dialed onto the telephone line, and line disconnect means responsive to receiving a busy signal after said stored number is redialed onto the telephone line and thereupon releasing the line.

16. The telephone set as in claim 15, and wherein said control circuit further comprises signaling means responsive to a ring when said stored number is redialed onto the telephone line, and thereupon providing an output signal.

17. The telephone set as in claim 15 and wherein said control means comprises holding switch means for temporarily suspending the operation of said control means, said holding switch means inhibiting said detector means from detecting said busy signals and inhibiting said memory from storing numbers.

18. The telephone set as in claim 15 and wherein said control means further comprises means responsive to receiving a ring signal when said number stored is re-dialed onto the telephone line, and for holding the line for a predetermined length of time and thereupon activating said line disconnect means for releasing the line and for terminating the operation of said control means and clearing said storing means.

19. The telephone set as in claim 3 and wherein said control means further comprises repetition counting means for counting the number of times said stored number is re-dialed onto the telephone line and upon reaching a predetermined count terminating the operation of said control means and clearing said storing means.

20. The attachment as in claim 2 and further comprising reset means coupled to said open line detector means and said signal detector means and producing a clear signal upon both the detection of the release of the telephone line and a ring signal, said clear signal clearing the telephone number from the storage means.

21. The telephone set as in claim 14 and further comprising reset means coupled to said open-line detector means and said signal detector means and producing a clear signal upon both the detection of the release of the telephone line and a ring signal, said clear signal clearing the telephone number from the storage means.

22. A method of achieving the completion of a telephone call, comprising the steps of:

a. dialing and transmitting a telephone number onto a telephone line utilizing a standard telephone set;

b. storing the telephone number as it is dialed onto the line;

c. monitoring the telephone line to detect the receiving of a busy signal in response to the initial dialing of the telephone number;

d. clearing the stored telephone number upon detection of a ring signal;

e. automatically re-dialing the telephone number onto a telephone line in response to a busy signal; and f. clearing the stored telephone number and terminating the automatic re-dialing upon detecting subsequent removal of the handset from its cradle.

* * * * *